United States Patent [19]
Noguchi

[11] Patent Number: 4,809,025
[45] Date of Patent: Feb. 28, 1989

[54] RECORDING APPARATUS

[75] Inventor: Akio Noguchi, Ebina, Japan

[73] Assignee: Canon Kabushiki Kaisha, Tokyo, Japan

[21] Appl. No.: 119,739

[22] Filed: Nov. 12, 1987

[30] Foreign Application Priority Data

Nov. 14, 1986 [JP] Japan ................................ 61-269865

[51] Int. Cl.⁴ ........................................... G01D 15/14
[52] U.S. Cl. ..................................... 346/154; 346/166
[58] Field of Search .................. 346/154, 160, 107 R, 346/108; 101/DIG. 13; 400/119; 350/6.1, 6.2; 365/518-521

[56] References Cited

U.S. PATENT DOCUMENTS 4,443,695  4/1984  Kitamura ........................... 346/160
4,445,128  4/1984  Dolan et al. ........................ 346/160

Primary Examiner—Arthur G. Evans
Attorney, Agent, or Firm—Fitzpatrick, Cella, Harper & Scinto

[57] ABSTRACT

A recording apparatus includes a motor driver for driving a motor which is rotated at constant revolutions for image formation, a rotation detector unit for detecting revolutions of the motor driven by the motor driver, and a control unit for outputting a control signal for image formation. The rotation detector unit detects the revolutions of the motor when a drive operation of the motor driver is started. The control unit changes an output timing of the control signal for starting the image formation in accordance with the detected revolutions.

18 Claims, 7 Drawing Sheets

FIG. 9

| TIME ELAPSED AFTER MOTOR-OFF x | REVOLUTIONS OF MOTOR y | WAITNG TIME TILL START OF PAPER FEED Tw |
|---|---|---|
| 1 | 10000 | 0 |
| 5 | 3000 | 1.3 |
| 20 | 700 | 10.3 |

RECORDING APPARATUS

BACKGROUND OF THE INVENTION

1. Field of the Invention

The present invention relates to a recording apparatus for efficiently performing a recording operation.

2. Related Background Art

A conventional motor for rotating a polygon mirror of, e.g., a laser beam printer requires (to be referred to as a scanner motor hereinafter) between ten and twenty seconds until it reaches predetermined revolutions after the motor is started. In addition, as necessary revolutions are increased, a time until the necessary revolutions are reached (rising time) tends to increase.

In some apparatuses, control is made such that the scanner motor is rotated after the apparatus is powered. In this case, power consumption is increased, and the service life of the scanner motor is adversely influenced. If the scanner motor is arranged to be stopped while it is out of use, control must be made in view of a time required until the scanner motor reaches predetermined revolutions, i.e., control must be made in any case in view of a maximum rising time from a motor stop state until the predetermined revolutions have been reached, and accordingly, throughput of the apparatus is degraded.

As a related art associated with an operation of the scanner motor, U.S. Pat. No. 4,647,946 is known. However, this art was not directed to improvement of the throughput of the apparatus.

SUMMARY OF THE INVENTION

It is an object of the present invention to eliminate the conventional drawbacks.

It is another object of the present invention to improve a recording apparatus.

It is still another object of the present invention to provide a recording apparatus for efficiently performing a recording operation.

It is still another object of the present invention to provide an economical recording apparatus.

It is still another object of the present invention to provide a recording apparatus which can detect revolutions of a motor which is rotated for image formation when the motor is started, and can change an output timing of a control signal for starting the image formation in accordance with the detected revolutions, thus performing an efficient recording operation.

It is still another object of the present invention to provide a recording apparatus which can count a time after the motor is started until it is restarted, and can change an output timing of a control signal for starting image formation in accordance with the counted time, thus performing an efficient recording operation.

The above and other objects of the present invention will become apparent from the following detailed description of the preferred embodiments taken in connection with the accompanying drawings.

BRIEF DESCRIPTION OF THE DRAWINGS

FIG. 9 is a table showing a time elapsed after the scanner motor is OFF, the revolutions of the motor, and a time until the paper feed starts, which is stored in a ROM;

DETAILED DESCRIPTION OF THE PREFERRED EMBODIMENTS

An embodiment of the present invention will be described with reference to the accompanying drawings.

Figure 1:
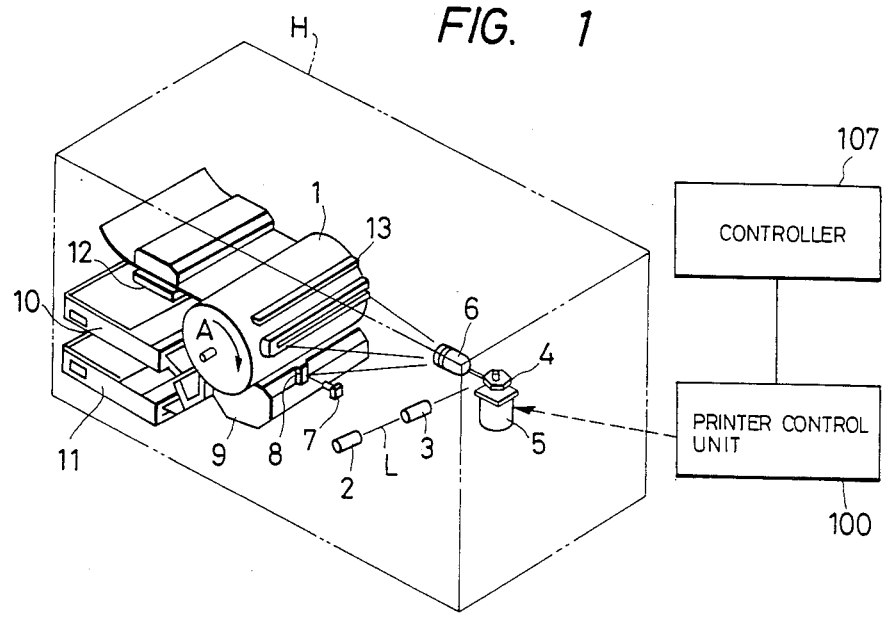
FIG. 1 is a view showing a laser beam printer according to an embodiment of the present invention.

FIG. 1 shows a laser beam printer according to an embodiment of the present invention. The laser beam printer receives data from a host controller 107 such as a computer to execute a recording operation under the control of a printer control unit 100.

In FIG. 1, a photosensitive drum 1 has a semiconductor surface layer such as selenium, cadmium sulfide, OPC (organic photosensitive cell), or the like, and is rotatably supported in a housing H. The drum 1 is rotated in a direction indicated by an arrow A. A semiconductor laser 2 emits a laser beam L, which is incident on a beam expander 3 to be converted into a laser beam having a predetermined beam spot size. The laser beam is incident on a polygon mirror 4 having a plurality of mirror surfaces. The polygon mirror 4 is rotated at a predetermined speed (or revolutions) by a scanner motor 5 which is driven by the print control unit 100 in response to a print start instruction from the controller 107. The laser beam emitted from the beam expander 3 is reflected by the polygon mirror 4 which is rotated at a constant number of revolutions, and substantially horizontally scans the surface of the photosensitive drum 1. The laser beam L is imaged, as a spot beam, on the photosensitive drum 1, which is charged to have a predetermined polarity by a charger 13, by an imaging lens 6 having f−φ characteristics.

A beam detector 7 detects a laser beam reflected by a reflection mirror 8. A timing of a modulation operation of the semiconductor laser 2 for obtaining desired optical information on the photosensitive drum 1 is determined by a detection signal from the beam detector 7. Meanwhile, an electrostatic latent image is formed on the photosensitive drum 1 by a laser beam which is imaged and scanned in accordance with input information. The latent image is visualized by toner in a developer 9, and is then transferred to a recording material stored in either cassette 10 or 11. The recording material passes a fixing device 12, so that the image is fixed on the recording material. Thereafter, the recording material is delivered onto a delivering unit (not shown).

Figure 2:
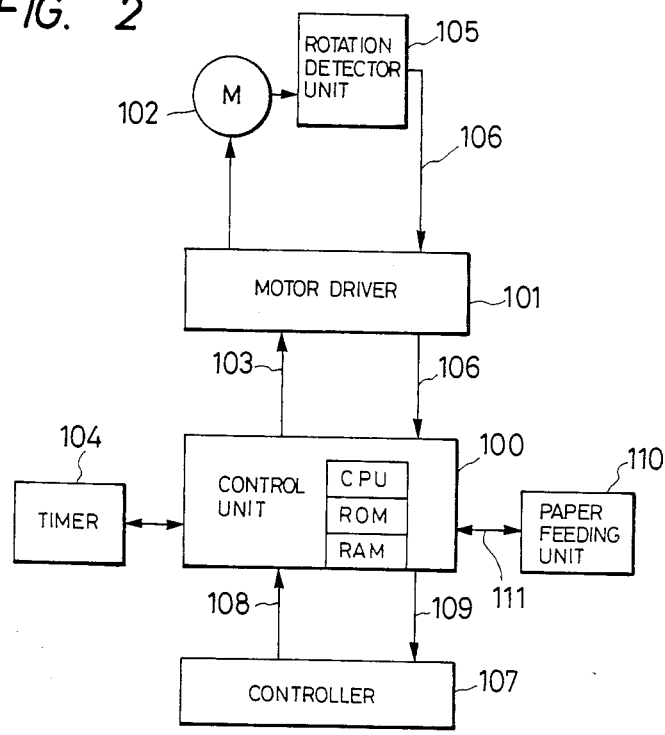
FIG. 2 is a block diagram showing an arrangement of the laser beam printer according to the embodiment shown in FIG. 1.

FIG. 2 is a block diagram showing the arrangement of the laser beam printer of this embodiment.

The control unit 100 controls the overall recording operation upon reception of an instruction 108 from the controller 107. The control unit 100 comprises a CPU such as a microprocessor, a ROM storing a CPU control program, data for calculating a start timing of a recording operation (to be described later), and the like, a RAM serving as a work area, and the like. A motor driver 101 rotates a motor 102 corresponding to the scanner motor 5 shown in FIG. 1 in accordance with a drive signal 103 from the control unit 100. A timer 104 counts a time from when the drive stop signal is output to the motor driver 101 upon instruction from the control unit 100 until the drive signal is again output. A rotation detector unit 105 comprises a Hall element or a photosensor, and detects a rotation of the motor 102 to output a rotation detection signal (TAC signal) 106. The control unit 100 receives the rotation detection signal 106 so as to detect a rotational state (revolutions) of the motor 102.

Note that an optical system, a fixing unit, and the like, are not directly related to the present invention, and a detailed description thereof will be omitted.

The scanner motor 5 in the printer shown in FIG. 2 must rise within a short period of time, and reach a constant high-speed rotational region.

Figure 3:
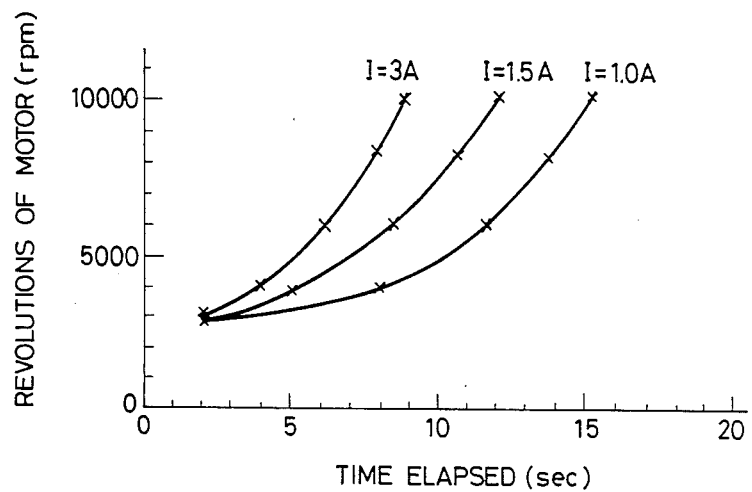
FIG. 3 is a graph showing the relationship between a time elapsed after a scanner motor is started and the revolutions of the scanner motor.

FIG. 3 is a graph showing the relationship between a time elapsed after the scanner motor is started and the revolutions of the motor using a current limiter as a parameter upon starting of the motor.

As can be seen from FIG. 3, if a current limiter I is increased, the rising time can be shortened. However, a power supply having a large current capacity is necessary, and it is not preferred in practical applications. Therefore, a description will be made with reference to a case wherein I=1.5 A.

Figure 4:
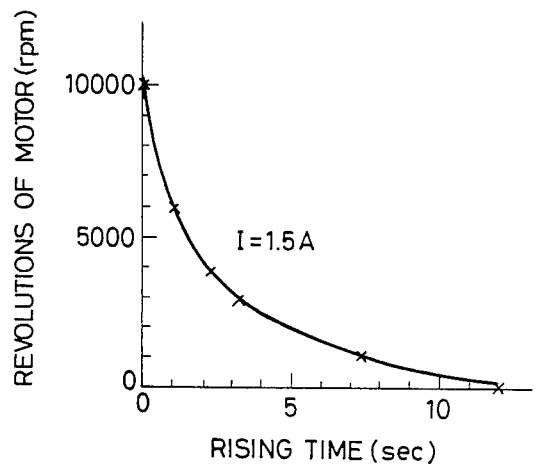
FIG. 4 is a graph showing a time from arbitrary revolutions until the scanner motor reaches a constant speed rotational state.

FIG. 4 is a graph showing a time until the scan motor has reached predetermined revolutions (10,000 rpm) from arbitrary revolutions if a constant speed rotational state corresponds to 10,000 rpm.

As can be understood from the comparison between FIGS. 3 and 4, the scanner motor can reach the constant rotational state faster if it rises from a state wherein the motor is rotated by inertia rather than from a state wherein the scanner motor rises from a stopped state.

Figure 5:
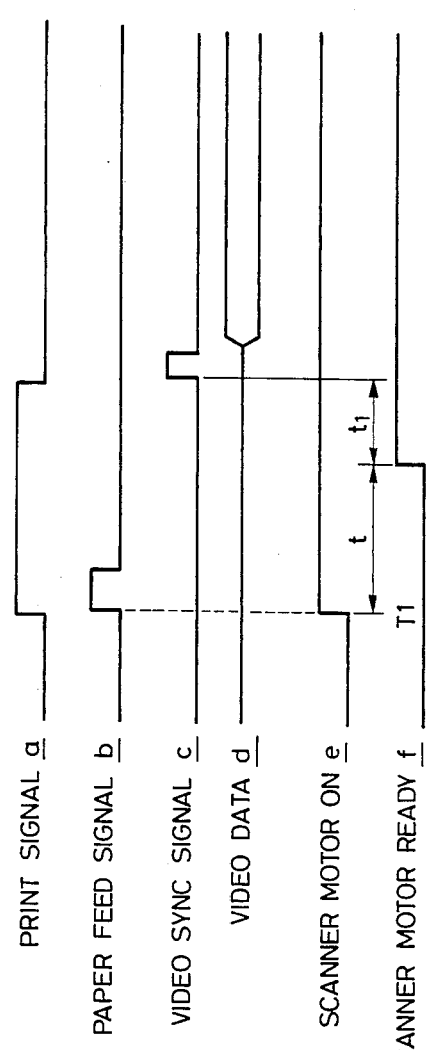
FIG. 5 is a timing chart showing a print timing when the scanner motor is not stopped.

FIG. 5 is a timing chart showing a print timing when the scanner motor (102 in FIG. 2) is rotated without being stopped in the printer of this embodiment.

When a print signal a is output from the controller 107 through a signal line 108, the control unit 100 outputs a paper feed signal b to a paper feeding unit 110 through a signal line 111 or a scanner motor ON signal e to the motor driver 101 through a signal line 103. Thus, after a time t (sec) has passed, the scanner motor 5 is ready. Furthermore, after a time $t_1$ has passed from the time t, the control unit 100 outputs a video sync signal c to the controller 107 through a signal line 109, and receives video data therefrom to start a print operation. The time $t_1$ is a waiting time for, e.g., laser beam adjustment after the ready operation or a time required until a recording sheet reaches a registration roller (not shown) for registering the sheet with respect to the photosensitive drum, and is normally about 0.3 sec.

Note that the video sync signal c is output to the controller 107 after the control unit 100 detects that the recording sheet has reached the registration roller.

Therefore, at least a time $t+t_1$ (sec) is required until the print operation is started in response to the print signal from the controller 107. In the printer of this embodiment, the time t from when the scanner motor ON signal e is input to the motor driver 101 until the scanner motor 5 is ready is about 1.7 sec, and the time $t_1$ from when the paper feed signal b is input to the paper feeding unit 110 until a recording sheet reaches the registration roller is about 0.3 sec.

More specifically, when the scanner motor 5 is rotated at predetermined revolutions (10,000 rpm) without being stopped, about 2 sec are necessary from when the print signal a is received from the host controller unit the print operation is enabled. Therefore, if the scanner motor 5 is arranged to be stopped while it is out of use, an output timing of the paper feed signal b is changed in consideration of a time required until the scanner motor 5 has reached predetermined revolutions and the above-mentioned time $t+t_1$, so that the recording operation of the apparatus can be started faster.

Figure 6:
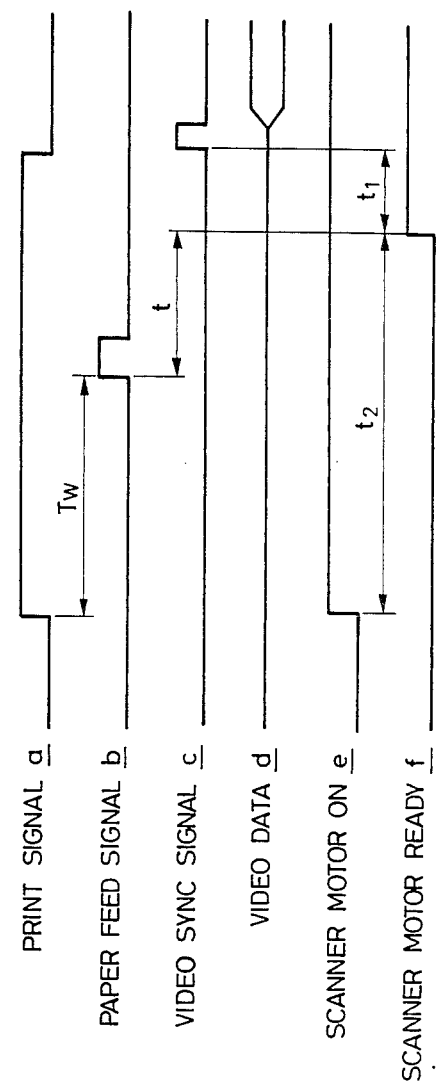
FIG. 6 is a timing chart when the scanner motor rises from a stopped state.

FIG. 6 is a timing chart showing a print timing when the scanner motor 5 is controlled so that the motor is stopped while it is out of use.

When the print signal a is output from the controller 107 in the same manner as in FIG. 5, the control unit 100 outputs the scanner motor ON signal e to the motor driver 101, thus starting rotation of the scanner motor 5. In FIG. 6, $t_2$ indicates a rising time from a stopped state of the scanner motor 5 until the scanner motor 5 can be rotated at constant revolutions. The time $t_2$ is about 12 sec as shown in FIG. 3. Therefore, in this case, a time Tw until the control unit 100 outputs the paper feed signal b is $t_2-t=12-1.7=10.3$ sec.

In this embodiment, since the time $t+t_1$ from when the paper feed signal b is output to the paper feeding unit 110 until the video sync signal c is output to the controller 107 is constant, the time Tw (10.3 sec) is changed in correspondence with the rotational state of the scanner motor 5 after it is stopped, thus improving throughput.

Figure 7:
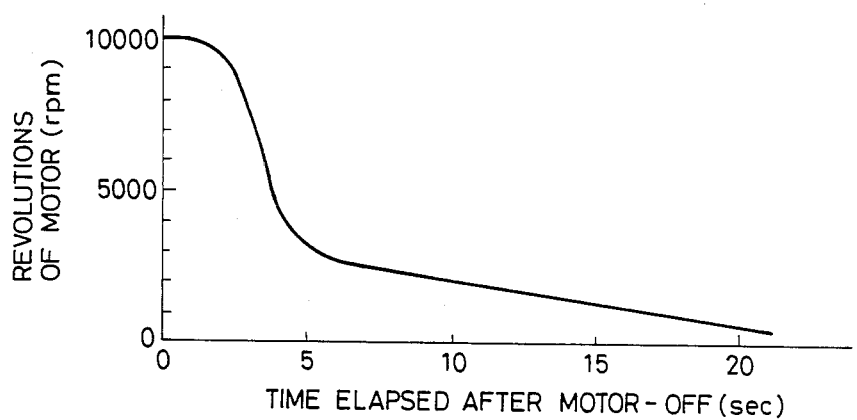
FIG. 7 is a graph showing the relationship between a time elapsed after motor-OFF and the revolutions of the motor.

FIG. 7 is a graph showing the relationship between a time elapsed after the scanner motor 5 is OFF and the revolutions of the motor.

As can be seen from FIG. 7, revolutions upon restarting the scanner motor 5 can be calculated from a time elapsed after the scanner motor is OFF until the scanner motor is restarted. For example, if 5 sec have passed from when the scanner motor 5 is OFF until it is restarted, the revolutions of the motor at that time are about 3,000 rpm.

Figure 8:
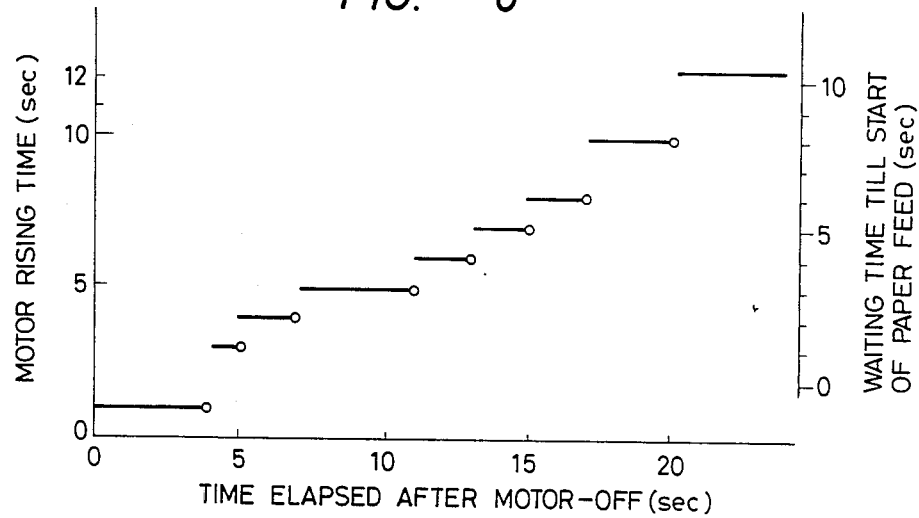
FIG. 8 is a graph showing the relationship between a time elapsed after motor-OFF, a motor rising time, and a waiting time until start of paper feed.

FIG. 8 is a graph showing the relationship between a time elapsed after motor-OFF obtained based on the rising time with respect to the revolutions shown in FIGS. 7 and 4.

As can be seen from FIG. 7, since the revolutions of the motor at that time can be calculated from a time elapsed after motor-OFF, the rising time until the motor has reached predetermined revolutions (10,000 rpm) can be calculated from the revolutions with reference to FIG. 4. For example, if 5 sec have passed from when the scanner motor 5 is OFF until it is restarted, the revolutions of the motor at that time are about 3,000 rpm. Therefore, the rising time from 3,000 rpm (about 3 sec) can be calculated from FIG. 4. This rising time corresponds to $t_2$ shown in FIG. 6, and the paper feed start timing can be calculated by subtracting t (1.7 sec) from $t_2$. Therefore, if 5 sec have passed after motor-OFF, the time Tw until the paper feed starts is $t_2$ (3 sec) − t (1.7 sec).

A waiting time until the paper feed starts with respect to a time elapsed after motor-OFF shown in FIG. 8 is stored in the ROM of the control unit 100. FIG. 9 shows a table stored in the ROM. With this table, a timing Tw at which the paper feed signal b is output to the paper feeding unit can be calculated from a time x elapsed after motor-OFF or the revolutions y of the motor.

Figure 10:
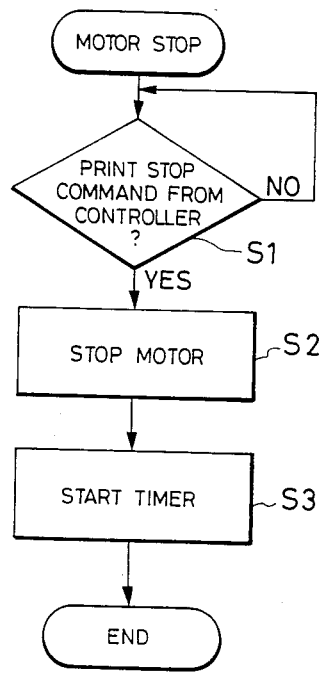
FIG. 10 is a flow chart showing a control sequence of a control unit when the scanner motor is stopped.

FIG. 10 is a flow chart in the control unit 100 when the scanner motor 5 is stopped.

When a print end instruction is supplied from the controller 107, the control unit 100 supplies a motor stop instruction to the motor driver 101. In step S2, drive operation of the scanner motor 5 is stopped. In step S3, the timer 104 for counting an elapsed time is started, thus ending motor stop processing.

Figure 11:
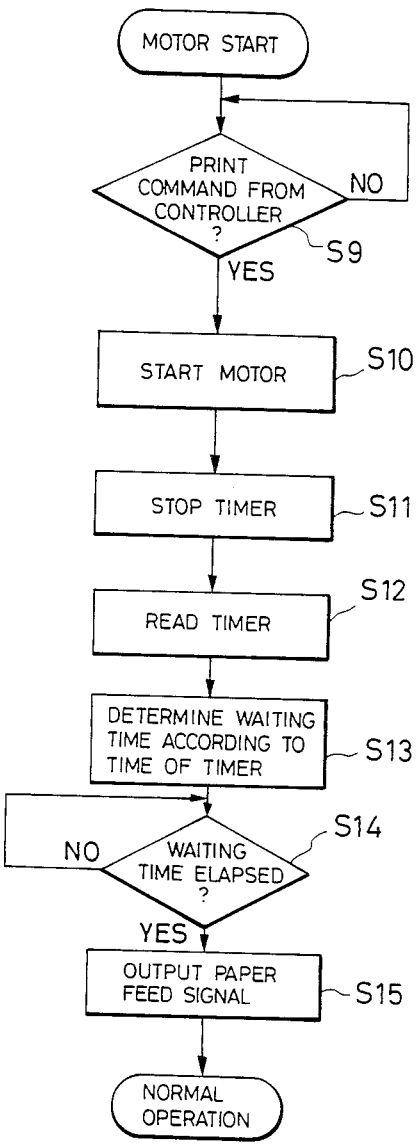
FIGS. 11 and 12 are flow charts showing control sequences of the control unit when the scanner motor is started.

FIG. 11 is a flow chart showing a control operation of the control unit 100 when the print signal a is output from the controller 107.

It is checked in step S9 if the print signal a is input from the controller 107. If YES in step S9, the scanner motor ON signal e for starting the scanner motor 5 is output to the motor driver 101 in step S10. In step S11, the timer 104 which has been started when the scanner motor 5 was stopped (FIG. 10) is stopped. In step S12, the count value of the timer 104 is fetched, and the elapsed time is calculated accordingly. In step S13, a waiting time Tw until paper feed is determined in accordance with the table shown in FIG. 9 stored in the ROM on the basis of the count time x of the timer 104. It is checked in step S14 if the waiting time has elapsed. If YES in step S14, the flow advances to step S15, and the paper feed signal b is output to the paper feeding unit 110. Thereafter, control enters a normal operation.

Figure 12:
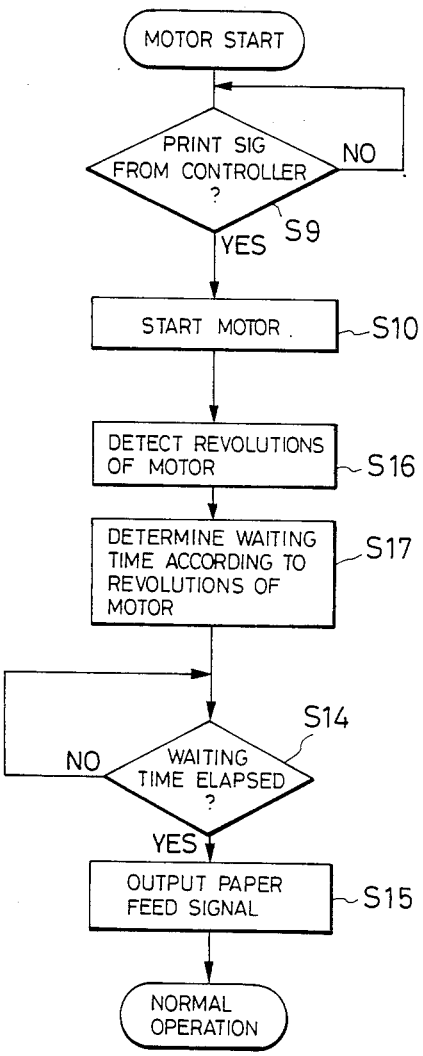

In this embodiment, the timer counts a time so that the output timing of the paper feed signal b is changed. However, as shown in the flow chart shown in FIG. 12, the rotation detector unit 105 can be used to count the PLL servo control TAC signal in step S16 to detect the revolutions y of the scanner motor. Thereafter, the time Tw after the scanner motor is OFF until the paper feed signal is ON can be determined from the table shown in FIG. 9. With this control, the timer used in the flow shown in FIG. 11 when the motor is stopped or is started can be omitted.

In this embodiment, a required time is divided in a digital manner as shown in FIG. 8. However, the relationships shown in FIGS. 4 and 7 may be expressed in formulas, and the above-mentioned time may be calculated in a software manner, thus further improving throughput with high precision.

According to the embodiment of the present invention as described above, a rising time when the next operation is started after the predetermined operation is ended can be detected, and the output timing of the paper feed signal is changed, so that the recording operation can be started immediately after the revolutions of the motor have reached a predetermined state. Therefore, throughput can be improved.

Note that in the above embodiment, the polygon mirror is used as a scanner. Instead, a galvano mirror may be used.

What is claimed is:
1. A recording apparatus comprising:
   drive means for driving a motor which is rotated at a constant speed for image formation;
   detection means for detecting revolutions of said motor driven by said drive means; and
   control means for outputting a control signal for image formation,
   wherein said detection means detects the revolutions of said motor when a drive operation of said drive means is started, and said control means changes an output timing of the control signal for starting the image formation in accordance with the detected revolutions.

2. An apparatus according to claim 1, wherein the control signal for starting the image formation output from said control means is a paper feed start signal of a recording medium.

3. An apparatus according to claim 1, wherein said drive means starts the drive operation of said motor in response to a recording start instruction from a host controller.

4. An apparatus according to claim 1, further comprising scanning means for rotating a polygon mirror by a drive force from said motor driven by said drive means, and reflecting a laser beam by the rotation of said polygon mirror, thereby performing a scanning operation.

5. An apparatus according to claim 1, wherein said control means has means for predicting a time required until the revolutions of said motor detected by said detection means reach predetermined revolutions, and outputs the control signal for starting the image formation in accordance with the predicted time.

6. An apparatus according to claim 5, wherein said predicting means comprises timer means for counting a time elapsed after the drive operation of said drive means is stopped, and predicts a time until the revolutions of said motor reach predetermined revolutions based on the elapsed time upon restarting the drive operation.

7. A recording apparatus comprising:
   drive means for driving a motor;
   timer means for counting a time after a drive operation of said drive means is stopped until the drive operation is restarted; and
   control means for outputting a control signal for image information;
   wherein said control means changes an output timing of the control signal for image formation in accordance with the time counted by said timer means.

8. An apparatus according to claim 7, wherein the control signal for starting the image formation output from said control means is a paper feed start signal of a recording medium.

9. An apparatus according to claim 7, wherein said drive means starts the drive operation of said motor in response to a recording start instruction from a host controller.

10. An apparatus according to claim 7, further comprising scanning means for rotating a polygon mirror by a drive force from said motor driven by said drive means, and reflecting a laser beam by the rotation of said polygon mirror, thereby performing a scanning operation.

11. An apparatus according to claim 7, wherein said control means has means for predicting a time required until the revolutions of said motor detected by said detection means reach predetermined revolutions, and outputs the control signal for starting the image formation in accordance with the predicted time.

12. An apparatus according to claim 7, further comprising detection means for detecting revolutions of said motor driven by said drive means.

13. A recording system comprising:
an external device for generating an image signal to form an image; and
an image formation device for performing transmission and reception of a control signal with said external device and for performing image formation responsive to the image signal transmitted from said external device,
wherein said image formation device comprises prediction means for predicting a timing capable of forming the image; and
control means for outputting the control signal for starting image formation in accordance with a predicted result by said prediction means.

14. A recording system according to claim 13, wherein said prediction means predicts the timing at which a speed of a motor rotated for image formation reaches a predetermined speed.

15. A recording system according to claim 14, further comprising scanning means for rotating a polygonal mirror by the rotation of said motor to perform laser beam scanning.

16. A recording system according to claim 13, wherein said control means outputs a paper feed signal for feeding a recording medium into said recording system, in accordance with the predicted result of said prediction means.

17. A recording system according to claim 13, wherein said control means transmits the control signal for starting image formation to said external device, and said external device changes a timing of image signal transmission in accordance with the transmitted control signal.

18. A recording system according to claim 13, wherein said prediction means predicts the timing capable of forming the image on the basis of a print start signal from said external device.

* * * * *